(12) United States Patent
Suzuki et al.

(10) Patent No.: US 11,524,573 B2
(45) Date of Patent: Dec. 13, 2022

(54) FUEL STORAGE DEVICE

(71) Applicant: SUBARU CORPORATION, Tokyo (JP)

(72) Inventors: Yasufumi Suzuki, Tokyo (JP); Kengo Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/236,838

(22) Filed: Apr. 21, 2021

(65) Prior Publication Data

US 2021/0354553 A1 Nov. 18, 2021

(30) Foreign Application Priority Data

May 14, 2020 (JP) .............................. JP2020-085316

(51) Int. Cl.
*B60K 15/035* (2006.01)
*B60K 15/04* (2006.01)

(52) U.S. Cl.
CPC .. *B60K 15/03504* (2013.01); *B60K 15/03519* (2013.01); *B60K 15/04* (2013.01); *B60K 2015/03514* (2013.01); *B60K 2015/03538* (2013.01); *B60K 2015/03576* (2013.01)

(58) Field of Classification Search
CPC ........ B60K 15/03504; B60K 15/03519; B60K 15/04; B60K 2015/03514; B60K 2015/03538; B60K 2015/03576
See application file for complete search history.

(56) References Cited

U.S. PATENT DOCUMENTS

| | | | | |
|---|---|---|---|---|
| 4,714,172 A | * | 12/1987 | Morris ................... | B65D 90/32 96/108 |
| 5,462,100 A | * | 10/1995 | Covert ............. | B60K 15/03519 137/589 |
| 5,813,434 A | * | 9/1998 | Horiuchi .......... | B60K 15/03519 137/202 |
| 5,816,287 A | * | 10/1998 | Hyodo ................. | F02M 25/089 123/519 |
| 5,931,141 A | * | 8/1999 | Chino .............. | B60K 15/03504 123/541 |
| 6,354,280 B1 | * | 3/2002 | Itakura ............. | B60K 15/03504 137/565.17 |
| 2013/0269532 A1 | * | 10/2013 | Kimoto .............. | B01D 53/0446 96/108 |
| 2016/0177884 A1 | * | 6/2016 | Shimokawa ....... | F02M 25/0836 123/519 |

FOREIGN PATENT DOCUMENTS

JP 2009-024561 A 2/2009

* cited by examiner

*Primary Examiner* — Patrick C Williams
(74) *Attorney, Agent, or Firm* — McGinn I.P. Law Group, PLLC

(57) ABSTRACT

A fuel storage device includes a fuel tank, a circulation passage, a canister, a vapor passage, and an adjuster. The fuel tank is configured to store fuel. The circulation passage fluidly connects the fuel tank and a vicinity of a fuel supply port. The canister is configured to recover gas generated in the fuel tank. The vapor passage fluidly connects the fuel tank and the canister. The adjuster is configured to adjust a circulation flow rate of the gas flowing through the circulation passage in supply of the fuel, using a negative pressure.

14 Claims, 3 Drawing Sheets

FUEL STORAGE DEVICE

CROSS-REFERENCE TO RELATED APPLICATIONS

The present application claims priority from Japanese Patent Application No. 2020-085316 filed on May 14, 2020, the entire contents of which are hereby incorporated by reference.

BACKGROUND

The disclosure relates to a fuel storage device provided with a structure of preventing gas such as evaporated fuel gas from being externally emitted in supply of fuel to a fuel tank.

In recent years, in the environment regulation with respect to automobiles and the like that use a high volatile liquid fuel, for example, gasoline, regulation (so-called evaporative control regulation) related to the evaporation amount of fuel to be released in the atmosphere (fuel vapor amount) has become strict more and more particularly in Europe and America areas and other areas. Moreover, even in areas where the legal regulation of this kind is not present, consideration of adding the similar regulation has been started.

For that reason, in automobiles, fuel storage devices that are equipped with various kinds of devices called a vehicle-mounted fuel supply steam recovery device, an evaporated fuel gas emission preventing device, and the like, which conform to the onboard refueling vapor recovery (ORVR) regulation, for example, have been proposed.

As the fuel storage devices of this kind, for example, Japanese Unexamined Patent Application Publication (JP-A) No. 2009-24561 and others have proposed various fuel storage devices in which evaporated fuel gas (also referred to as fuel vapor) is caused to flow into a canister that has housed activated charcoal, for example, and is thus recovered, and the evaporated fuel gas recovered in this manner is sent to a combustion chamber of an engine by a negative pressure at a side of the engine, and thus is combusted with vaporized fuel that is sent from a fuel tank through a fuel pump, a fuel injection device, and the like to the combustion chamber, so that evaporated fuel gas to be generated in the fuel tank and in a fuel pipe system is recovered, and the evaporated fuel gas is prevented from emitting to an outside in supply of fuel and the like.

SUMMARY

An aspect of the disclosure provides a fuel storage device includes a fuel tank, a circulation passage, a canister, a vapor passage, and an adjuster. The fuel tank is configured to store fuel. The circulation passage fluidly connects the fuel tank and a vicinity of a fuel supply port. The canister is configured to recover gas to be generated in the fuel tank. The vapor passage fluidly connects the fuel tank and the canister. The adjuster is configured to adjust a circulation flow rate of the gas flowing through the circulation passage in supply of the fuel, using a negative pressure.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
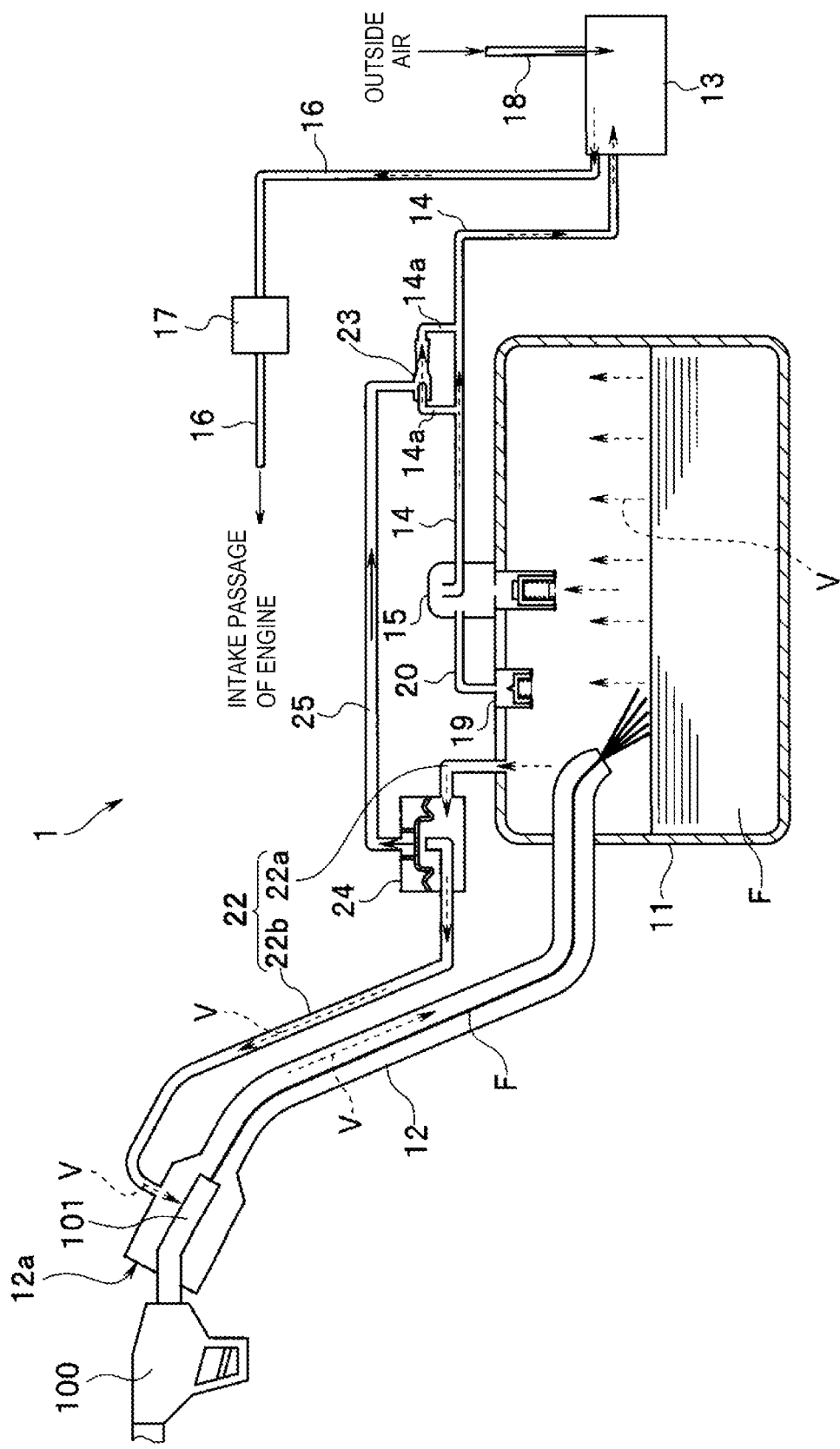
FIG. 1 is a schematic configuration diagram of an entire configuration of a fuel storage device according to an embodiment of the disclosure.

In the fuel storage devices disclosed in JP-A No. 2009-24561 and the like, the concentration of the evaporated fuel gas sent from the canister into the engine combustion chamber may not be stable. Accordingly, the engine combustion becomes unstable, there has been room for improvement in terms of poor quality of the exhaust gas and a problem caused in the engine function.

In order to solve such problems, for example, it has been known that in supply of fuel to the fuel tank, the reduction in the vapor amount of fuel flowing from the fuel tank into the canister is effective.

Therefore, as a configuration for reducing the vapor amount of fuel flowing from the fuel tank into the canister in supply of fuel, for example, a fuel storage device having a configuration of separately providing, in addition to a passage (line) through which evaporated fuel gas generated in the fuel tank and the fuel pipe system is introduced into the canister, a passage (line) that leads from the fuel tank to the vicinity of a supply oil port, and circulating the evaporated fuel gas by using an increase in pressure in the fuel tank generated in supply of fuel, has been proposed and has become commercially practical.

With this configuration, "in supply oil at high speed", the evaporated fuel gas generated in the fuel tank and the fuel pipe system can flow with high efficiency from the fuel tank through the circulation passage to a supply oil pipe to circulate. However, on the other hand, "in supply oil at low speed", the vapor amount of fuel to be sent from the fuel tank to the vicinity of the supply oil port through the circulation passage may be excessive compared with the vapor amount of fuel that can be returned to a side of the fuel tank with the fuel flowing through the supply oil pipe. In this case, the evaporated fuel gas may be leaked from the supply oil port to the outside, which causes a problem of exceeding a limit of the emission amount of evaporated fuel gas under the ORVR regulation.

It is desirable to provide a fuel storage device that can reliably prevent gas such as evaporated fuel gas from externally emitting in supply of fuel to a fuel tank.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a schematic configuration diagram of an entire configuration of a fuel storage device according to an embodiment of the disclosure. As illustrated in FIG. 1, a fuel storage device 1 in the embodiment of the disclosure mainly includes a fuel tank 11, a supply oil pipe 12, a canister 13, an ejector 23, a plurality of pipe line members, a plurality of valve members (valves), and the like.

Examples of the plurality of pipe line members include a vapor passage 14, a vapor branch passage 14a, a purge passage 16, an atmospheric passage 18, a depressurization passage 20, a breather passage 22, and a negative pressure introduction passage 25.

Examples of the plurality of valve members (valves) include a vent valve 15, a purge control valve 17, a fuel cutoff valve 19, and a differential pressure valve 24.

The fuel tank 11 is a container that stores fuel F, such as gasoline, to be injected thereto through the supply oil pipe 12. The fuel F stored in the fuel tank 11 is supplied to an engine (not illustrated) using a fuel pump, which is not illustrated. One end of the supply oil pipe 12 is coupled to the fuel tank 11. Moreover, the fuel tank 11 communicates with a vicinity of a fuel supply port 12a, that is a predetermined portion of the supply oil pipe 12, with the breather passage 22.

In other words, one end of the breather passage 22 is coupled to an upper surface of the fuel tank 11, for example, as illustrated in FIG. 1, and is inserted into an internal space of the fuel tank 11. Moreover, as illustrated in FIG. 1, the other end of the breather passage 22 is coupled to the vicinity of the fuel supply port 12a in the supply oil pipe 12, and is inserted into an internal space of the supply oil pipe 12. In this case, as illustrated in FIG. 1, the vicinity of the fuel supply port 12a is a coupling portion of the other end of the breather passage 22.

Herein, as the coupling portion of the other end of the breather passage 22, for example, as illustrated in FIG. 1, when a supply oil nozzle 101 of a supply oil gun 100 is inserted from the fuel supply port 12a, and the supply oil nozzle 101 is disposed at a prescribed position in the fuel supply port 12a, an opening in the coupling portion of the other end of the breather passage 22 is disposed at a position that is opposed to a side surface of the supply oil nozzle 101.

Moreover, in addition, the fuel tank 11 communicates with the canister 13 with the vapor passage 14 and the depressurization passage 20.

Note that, in the fuel tank 11, a fuel pump (not illustrated) for supplying the fuel F in the tank to an engine (not illustrated) is disposed. These not-illustrated configurations are parts that are not directly related to the disclosure, and thus illustration and detailed description thereof will be omitted.

The supply oil pipe 12 is a tubular member for injecting the fuel F into the fuel tank 11. For that reason, both ends of the supply oil pipe 12 are open, one end thereof is coupled to the fuel tank 11, and a supply oil port 12a that externally opens is provided to the other end. A lid member (not illustrated) is detachably provided to the supply oil port 12a. Further, in supply of fuel, in a state of the lid member having been detached, the supply oil nozzle 101 of the supply oil gun 100 is inserted from the supply oil port 12a into the supply oil pipe 12 to perform a supply oil operation. Note that, in the vicinity of the supply oil port 12a of the supply oil pipe 12, as described above, one end of the breather passage 22 is coupled.

The canister 13 is a container that is provided so as to recover evaporated fuel gas generated in the fuel tank 11 and in the fuel pipe system, and prevent the fuel evaporation gas from emitting in the atmosphere. In an inside of the canister 13, a substance (for example, activated charcoal) that adsorbs the evaporated fuel gas is filled. The canister 13 communicates with the fuel tank 11 with the vapor passage 14. Moreover, the canister 13 further communicates with an intake passage (not illustrated) of the engine (not illustrated) with the purge passage 16. In addition, the canister 13 communicates with an outside with the atmospheric passage 18. Note that, as for the canister 13, a canister having a well-known form is applied, and thus the description of the detailed configuration and the illustration of the canister 13 will be omitted.

The ejector 23 generates a negative pressure using a part of the evaporated fuel gas in the vapor passage 14 that fluidly connects the fuel tank 11 and the canister 13. In one embodiment, the ejector 23 may serve as a "negative pressure" generator. For that reason, the ejector 23 is provided on the vapor branch passage 14a as a passage that is branched at an intermediate portion of the vapor passage 14 and is thereafter again joined to the vapor passage 14.

Figure 2:
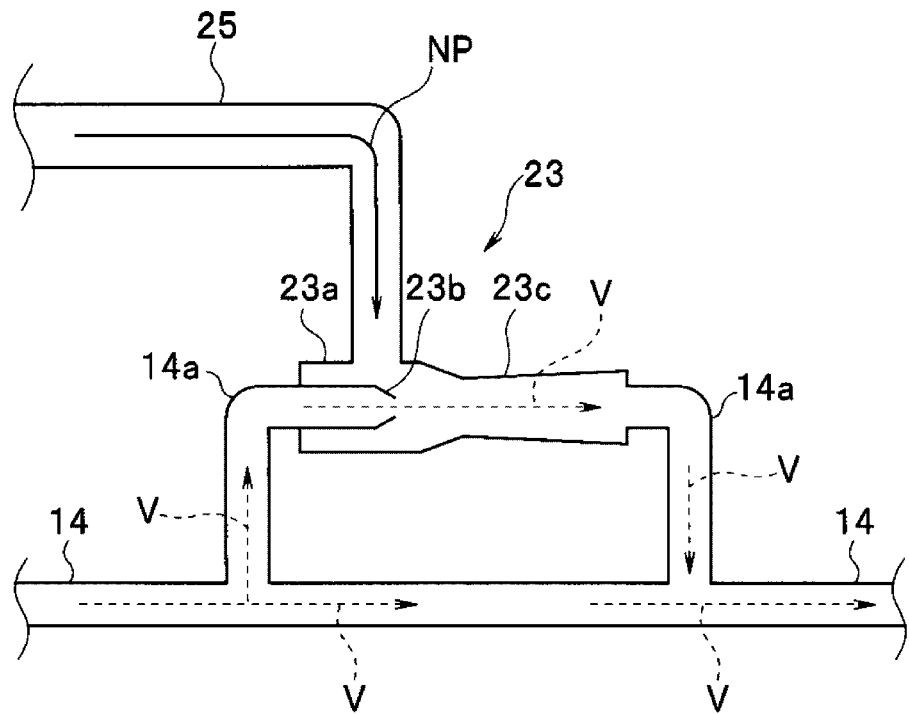
FIG. 2 is a schematic diagram illustrating an internal configuration of an evaporated fuel circulation flow rate adjuster (ejector) applied to the fuel storage device is FIG. 1.

Herein, a detailed configuration of the ejector 23 will be described. FIG. 2 is a schematic diagram illustrating an internal configuration of the ejector applied to the fuel storage device according to the embodiment. The ejector is a evaporated fuel circulation flow rate adjuster that, in one embodiment, may serve as an "adjuster".

As illustrated in FIG. 2, the ejector 23 mainly includes a main body 23a, a nozzle 23b, and a diffuser 23c.

The main body 23a is a housing member that houses the nozzle 23b and the diffuser 23c in an inside thereof. The vapor branch passage 14a is coupled to each of both ends of the main body 23a. In other words, the ejector 23 is disposed on the vapor branch passage 14a. Herein, the vapor branch passage 14a branches off in the intermediate portion of the vapor passage 14, then pass through the ejector 23, and thereafter again join the vapor passage 14.

In the main body 23a, an opening into which one end of the negative pressure introduction passage 25 is coupled is formed on one surface that is located in a direction orthogonal to the vapor branch passage 14a (a passage of evaporated fuel gas V; see FIG. 2).

The nozzle 23b is a configuration unit that generates a negative pressure in an inside of the main body 23a by narrowing down and injecting at high speed the flow of the evaporated fuel gas V (see FIG. 2), which has flowed from the vapor passage 14 into the vapor branch passage 14a.

The diffuser 23c is a configuration unit that mixes the high-pressure evaporated fuel gas V to be injected at high speed from the nozzle 23b with gas (air) sucked due to the negative pressure generated by the nozzle 23b through the negative pressure introduction passage 25, and causes the mixed gas to flow. Note that, an arrow illustrated by a reference numeral NP in FIG. 2 indicates a direction along which the gas (air) to be sucked through the negative pressure introduction passage 25 flows.

With such a configuration, the evaporated fuel gas V, which has flowed from the vapor passage 14 into the vapor branch passage 14a, is narrowed down by the nozzle 23b and injected at high speed. Accordingly, a negative pressure is generated in the inside of the main body 23a. Subsequently, the gas (air) passed through the negative pressure introduction passage 25 is sucked by the negative pressure, the inside of the main body 23a. Herein, the evaporated fuel gas V injected from the nozzle 23b and the gas (air) sucked through the negative pressure introduction passage 25 are mixed in the diffuser 23c, and flow out to an outlet of the diffuser 23c. Further, the mixed fluid is retuned from the vapor branch passage 14a to the vapor passage 14 while being decelerated inside the diffuser 23c, and flows toward the canister 13 side.

In this manner, the ejector 23 in the fuel storage device in the embodiment generates a predetermined negative pressure in the intermediate portion of the vapor passage 14 in accordance with the flow rate of the evaporated fuel gas.

Referring back to FIG. 1, among the plurality of pipe lines in the fuel storage device 1 in the embodiment, as described above, the vapor passage 14 is a pipe line member forming a passage that fluidly connects the fuel tank 11 and the canister 13, and the evaporated fuel gas V generated in the fuel tank 11 and in the fuel pipe system to head for the canister 13. The vapor passage 14 also serves as a passage that causes the evaporated fuel gas V remaining in the canister 13 to return to the fuel tank 11, when an internal pressure of the fuel tank 11 becomes a negative pressure higher than the defined negative pressure.

In this case, one end of the vapor passage 14 is coupled to the canister 13. Moreover, the other end of the vapor passage 14 is coupled to the vent valve 15 disposed to the upper surface of the fuel tank 11. Further, as described above, the vapor branch passage 14a is provided in the intermediate portion of the vapor passage 14, and the ejector 23 is provided on the vapor branch passage 14a.

The purge passage 16 is a pipe line member that fluidly connects the canister 13 and the intake passage (not illustrated) of the engine (not illustrated). The purge passage 16 is a pipe line member that sends (purges) the evaporated fuel gas recovered to the canister 13 into the intake passage of the engine. The purge control valve 17 is disposed on the purge passage 16.

The atmospheric passage 18 is a pipe line member that introduces the gas (air) from the outside to the inside of the canister 13, or emits the gas (air) from the canister 13 to the outside.

The breather passage 22 is a pipe line member that fluidly connects the fuel tank 11 and a predetermined portion (vicinity of the supply oil port 12a) of the supply oil pipe 12. Further, the differential pressure valve 24 is disposed on the breather passage 22. For that reason, as illustrated in FIG. 1, the breather passage 22 includes a first breather passage 22a at a side of the fuel tank 11 from the differential pressure valve 24, and a second breather passage 22b at a side of the supply oil pipe 12 from the differential pressure valve 24. In other words, as described in details, the first breather passage 22a communicates with the fuel tank 11 and the differential pressure valve 24. The second breather passage 22b communicates with the differential pressure valve 24 and the predetermined portion (vicinity in the supply oil port 12a) of the supply oil pipe 12. In one embodiment, the differential pressure valve 24 may serve as a part of a "negative pressure generator".

The negative pressure introduction passage 25 is a pipe line member that fluidly connects the ejector 23 and the differential pressure valve 24. For that reason, one end of the negative pressure introduction passage 25 is coupled to an opening of the main body 23a in the ejector 23. Moreover, the other end of the negative pressure introduction passage 25 is coupled to a negative pressure introduction port 24f of an upper chamber 24d, which is described later, in the differential pressure valve 24 (see FIGS. 3 and 4). In one example, the negative pressure introduction port 24f may serve as a "negative pressure inlet".

Meanwhile, among the plurality of valve members (valves) in the fuel storage device 1 in the embodiment, the vent valve 15 is provided to the upper surface of the fuel tank 11, and the other end of the vapor passage 14 is coupled thereto.

The vent valve 15 releases the gas in the fuel tank 11 through the vapor passage 14 to the canister 13 in supply of fuel, and is an excessive supply oil prevention valve that is closed when a fuel liquid surface in the fuel tank 11 reaches a prescribed fill-up position to detect a fill-up state and prevent excessive supply oil. In addition, in such a case that the fuel tank 11 swings and tilts during when a vehicle on which the fuel storage device 1 is mounted is traveling, and an oil level of the fuel in the fuel tank 11 temporarily rises, the vent valve 15, which becomes a closed state, prevents the fuel from entering the vapor passage 14.

Further, in a state where the vent valve 15 is open, the fuel tank 11 communicates with the canister 13, so that the evaporated fuel gas V generated in the fuel tank 11 and in the fuel pipe system is introduced into the canister 13 through the vapor passage 14.

The vent valve 15 is a float valve including a float and an urging spring, for example. The vent valve 15 raises the float as the fuel oil level rises, and blocks the opening (opening to which the other end of the vapor passage 14 is coupled) in the upper surface of the fuel tank 11. Accordingly, the vent valve 15 becomes the closed state in the fill-up state. Note that, as for the vent valve 15, a vent valve similar to those generally used in known fuel storage devices is applied, so that a description of the detailed configuration will be omitted.

As described above, when the fuel tank 11 becomes the fill-up state by the supply of fuel, the vent valve 15 becomes the closed state. Accordingly, when the fuel tank 11 in this state is left to stand, and for example, the internal temperature in the fuel tank 11 or the temperature of the fuel itself has risen, the internal pressure of the fuel tank 11 increases, and an amount of force to expand the fuel tank 11 may be acted. Therefore, when the fuel tank 11 is in the fill-up state and the vent valve 15 becomes the closed state, as a technique to release the internal pressure of the fuel tank 11, the fuel storage device 1 in the embodiment is provided with the fuel cutoff valve 19 and the depressurization passage 20.

The fuel cutoff valve 19 releases the internal pressure of the fuel tank 11 in a normal state while maintaining an opened state. Meanwhile, the fuel cutoff valve 19 becomes the closed state in a case where the fuel in the fuel tank 11 swings and tilts during when the vehicle is traveling and the oil level of the fuel inside the fuel tank 11 temporarily rises, so that the fuel cutoff valve 19 prevents the fuel from entering the vapor passage 14.

The fuel cutoff valve 19 is a float valve including a float and an urging spring, for example. One end of the depressurization passage 20 is coupled to the fuel cutoff valve 19. Moreover, the other end of the depressurization passage 20 is coupled to the vent valve 15. Accordingly, when the fuel cutoff valve 19 is an open state, the internal space of the fuel tank 11 communicates with the canister 13 through the fuel cutoff valve 19, the depressurization passage 20, the vent valve 15, and the vapor passage 14.

The purge control valve 17 is provided on the purge passage 16, and is in a closed valve state in normal times.

Moreover, in the purge control valve 17, when the engine starts, the valve opening degree is controlled as appropriate by an engine control device (ECU), which is not illustrated. Further, the purge control valve 17 is opened, the canister 13 communicates with the intake passage (not illustrated) of the engine. Accordingly, when the engine starts, a negative pressure is generated on the side of the intake passage of the engine, the evaporated fuel gas recovered in the canister 13 flows to the side of the intake passage of the engine. Further, the evaporated fuel gas together with vaporized fuel (air-fuel mixture) from a fuel injection device is sucked into a combustion chamber of the engine, and is combusted together.

The differential pressure valve 24 is a valve member that adjusts as appropriate the flow rate of gas such as evaporated fuel gas flowing through the breather passage 22. In one embodiment, the differential pressure valve 24 may serve as an "adjuster". For that reason, as described above, the other end of the negative pressure introduction passage 25 is coupled to the differential pressure valve 24 that is provided on the breather passage 22.

Figure 3:
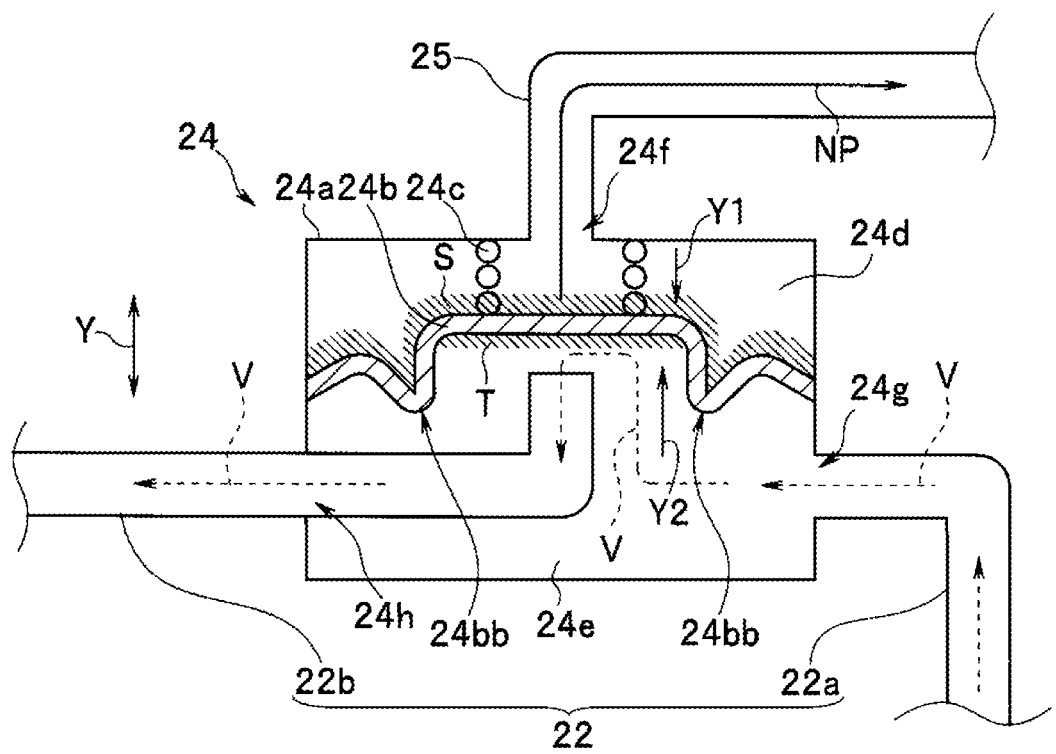
FIG. 3 is a schematic diagram illustrating an internal configuration of a differential pressure valve in a load state in the fuel storage device in FIG. 1.
Figure 4:
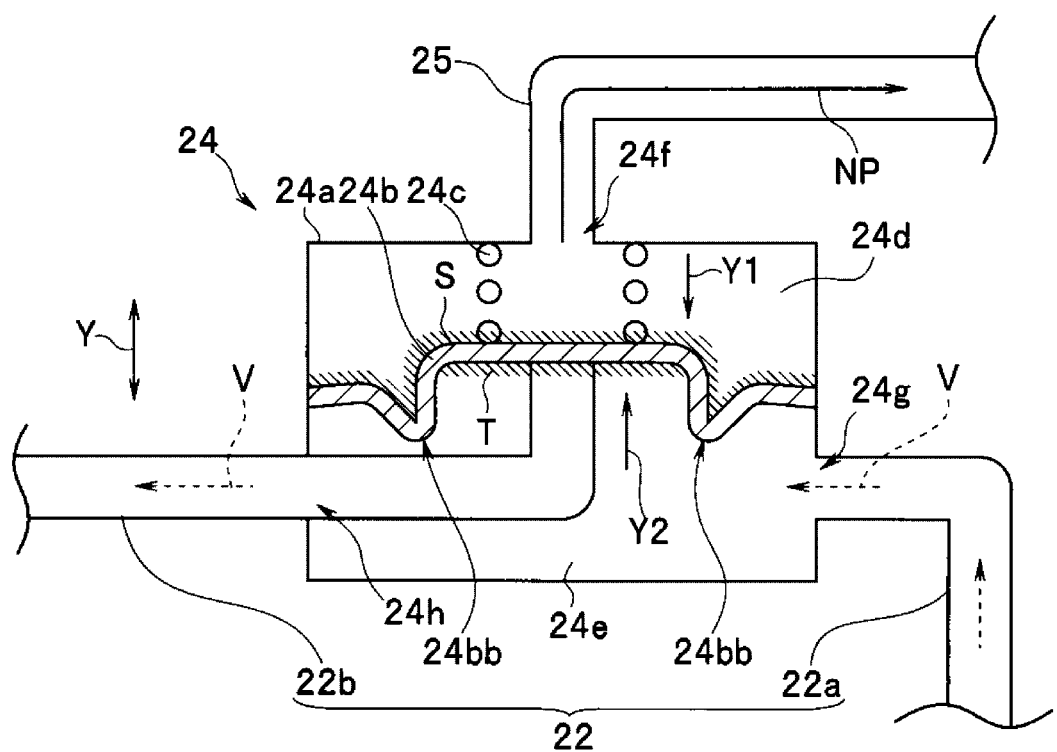
FIG. 4 is a schematic diagram illustrating the internal configuration of the differential pressure valve in a no-load state in the fuel storage device in FIG. 1.

Herein, a detailed configuration of the differential pressure valve 24 will be described. FIGS. 3 and 4 are schematic diagrams illustrating an internal configuration of a differential pressure valve applied to the fuel storage device in the embodiment. Among the drawings, FIG. 3 illustrates a state where a load (suction force by the negative pressure) is applied to the differential pressure valve. Moreover, FIG. 4 illustrates a normal state where no load is applied to the differential pressure valve.

As illustrated in FIGS. 3 and 4, the differential pressure valve 24 mainly includes a main body 24a, a movable valve 24b, and an urging spring 24c.

The main body 24a is a housing member that houses the movable valve 24b and the urging spring 24c in an inside thereof. The main body 24a has the upper chamber 24d and a lower chamber 24e that are defined by the movable valve 24b.

In the upper chamber 24d, the negative pressure introduction port 24f is opened and leads to the ejector 23 through the negative pressure introduction passage 25. The other end of the negative pressure introduction passage 25 is coupled to the negative pressure introduction port 24f.

Moreover, the lower chamber 24e has a first ventilation port 24g and a second ventilation port 24h. Of the ventilation ports, the first ventilation port 24g is coupled to one end of the first breather passage 22a at the side of the fuel tank 11. The evaporated fuel gas V flows into the differential pressure valve 24 through the first ventilation port 24g. In one embodiment, the first ventilation port 24g may serve as an "inflow opening" at an inlet side. Moreover, the second ventilation port 24h is coupled to the other end of the second breather passage 22b at the side of the supply oil pipe 12. The evaporated fuel gas flows out from the differential pressure valve 24 through the second ventilation port 24h. In one embodiment, the second ventilation port 24h may serve as an "outflow opening" at an outlet side.

Note that, in the examples illustrated in FIGS. 3 and 4, the second ventilation port is a portion to which the other end of the second breather passage 22b is coupled to the lower chamber 24e of the main body 24a, and is illustrated by being assigned with a reference numeral 24h. However, in a configuration example of the illustration, an end opening of the second breather passage 22b actually serves as a second ventilation port. In the example, for convenience, the description is made on the assumption that the portion indicated by the reference numeral 24h is the second ventilation port.

With such a configuration, the evaporated fuel gas V in the fuel tank 11 flows through the first breather passage 22a from the first ventilation port 24g into the lower chamber 24e of the differential pressure valve 24. Thereafter, the evaporated fuel gas V flows out from the second ventilation port 24h (end opening of the second breather passage 22b) of the lower chamber 24e. Then, the evaporated fuel gas V after passing through the second breather passage 22b flows out into the vicinity of the supply oil port 12a of the supply oil pipe 12, as illustrated in FIG. 1. In addition, in supply oil, the evaporated fuel gas V returns through the supply oil pipe 12 into the fuel tank 11. In this manner, the fuel storage device 1 of the embodiment is provided with a circulation passage of the evaporated fuel gas V in supply of fuel.

In this case, the portion in which one end of the second breather passage 22b is coupled to the supply oil pipe 12 is set in the vicinity of the supply oil port 12a. Therefore, a flow direction of the evaporated fuel gas V in the supply oil pipe 12 is regulated to a flow direction from the supply oil port 12a to the side of the fuel tank 11. In other words, the vicinity of the supply oil port 12a is at a slight negative pressure in supply oil due to blow-off of the fuel F from the supply oil gun 100 toward the fuel tank 11. With the negative pressure, the flow direction of the evaporated fuel gas V in the supply oil pipe 12 is regulated so as to head for the side of the fuel tank 11. Accordingly, this prevents the evaporated fuel gas V from emitting from the vicinity of the supply oil port 12a to the outside.

Moreover, in this case, the coupling portion in which one end of the second breather passage 22b is coupled to the supply oil pipe 12, that is, an outlet position of the circulation passage is desirably disposed by considering the following conditions.

To put it briefly, one end opening of the second breather passage 22b is to be set at a position where the outlet is not blocked by the fuel being supplied. In one example, the one end opening of the second breather passage 22b may serve as the outlet of the circulation passage. For example, (1) a position where the opening is not blocked by the fuel F that flows out from the supply oil nozzle 101 during supply oil; and (2) a position where the opening is not blocked by the fuel rising near the supply oil port in a state where the fuel tank 11 is filled (so-called fill-up state) or a state close to the fill-up state are desirably set.

In addition, as another condition, the one end opening of the second breather passage 22b is desirably provided at a position at the negative pressure. As described above, it can be said that the position where the outlet (one end opening of the second breather passage 22b) of the circulation passage is desirably provided in the vicinity of the supply oil port 12a at the negative pressure in supply oil.

The movable valve 24b is, as described above, a partition wall (diaphragm) that partitions the main body 24a into the two chambers of the upper chamber 24d and the lower chamber 24e. In one example, the movable valve 24b may serve as a "movable valve member". The movable valve 24b is movable as appropriate in the main body 24a in accordance with a difference between the pressure in the upper chamber 24d and the pressure in the lower chamber 24e, in an arrow Y direction illustrated in FIGS. 3 and 4.

Note that, in this case, the movable valve 24b is in a state where a circumferential edge thereof is fixed to an inner surface wall of the main body 24a. Accordingly, a movable portion in the movable valve 24b is a portion other than the circumferential edge.

The urging spring 24c urges the movable valve 24b in a predetermined direction (an arrow Y1 direction in FIGS. 3 and 4). In one embodiment, the urging spring 24c may serve as an "urging member". Note that, in the examples illustrated in FIGS. 3 and 4, the urging spring 24c is exemplified as a coil spring, but is not limited to this form.

Herein, when the differential pressure valve 24 is in the normal state (that is, no-load state; the state in FIG. 4), an urging force in the arrow Y1 direction by the urging spring 24c is simply applied to the movable valve 24b. Accordingly, the movable valve 24b is disposed at a predetermined position (position illustrated in FIG. 4) in the vicinity of the end opening of the second breather passage 22b. In this state, a lower surface of the movable valve 24b blocks the end opening of the second breather passage 22b, and the differential pressure valve 24 is in a closed state. Accordingly, the evaporated fuel gas V entered the lower chamber 24e from the first breather passage 22a is in a state of not flowing out into the second breather passage 22b.

Meanwhile, in supply of fuel to the fuel tank 11, a predetermined effect by the evaporated fuel gas V, which is described later, acts on the ejector 23 and the differential pressure valve 24. Accordingly, the movable valve 24b of the differential pressure valve 24 moves in an arrow Y2 direction in FIGS. 3 and 4 against the urging force by the urging spring 24c to obtain a state illustrated in FIG. 3.

At this time, a gap is generated between the lower surface of the movable valve 24b and the end opening of the second breather passage 22b. Accordingly, the evaporated fuel gas V entered the lower chamber 24e from the first breather passage 22a flows from the gap to the second breather passage 22b.

In this case, in accordance with the pressure of the evaporated fuel gas V entered the lower chamber 24e from the first breather passage 22a, the movement amount in the arrow Y2 direction of the movable valve 24b of the differential pressure valve 24 changes. Accordingly, in accordance with the movement amount in the arrow Y2 direction of the movable valve 24b, the size of the gap between the lower surface of the movable valve 24b and the end opening of the second breather passage 22b also changes. Accordingly, the flow rate of the evaporated fuel gas V passing through the gap also changes. Note that, a further detailed action in the fuel storage device 1 in the embodiment will be described later.

In this manner, the differential pressure valve 24 in the fuel storage device 1 in the embodiment adjusts the flow rate of the evaporated fuel gas flowing from the first breather passage 22a to the second breather passage 22b.

Note that, among the respective ports provided to the differential pressure valve 24, an area of a surface (see an oblique line indicated by a reference numeral S in FIGS. 3 and 4) on which the movable valve 24b receives a negative pressure from the negative pressure introduction port 24f and an area of a surface (see an oblique line indicated by a reference numeral T in FIGS. 3 and 4) on which the movable valve 24b receives a positive pressure from the first ventilation port 24g are set so as to maintain a relation, for example, "the surface (S) at the side of the negative pressure introduction port>the surface (T) at the side of the first ventilation port".

In the embodiment, as illustrated in FIGS. 3 and 4, folding portions 24bb as mountain folds from the upper chamber 24d side to the lower chamber 24e side with respect to parts of the movable valve 24b. With such a configuration, the negative pressure from the negative pressure introduction port 24f is received on the entire surface indicated by the reference numeral S, whereas the positive pressure from the first ventilation port 24g is received on the surface only indicated by the reference numeral T.

With such a configuration, even if the negative pressure from the negative pressure introduction port 24f is weak, the movable valve 24b can be easily moved in the predetermined direction (Y2 direction). In contrast, if the positive pressure from the first ventilation port 24g does not become equal to or more than a predetermined value, the movable valve 24b is configured so as not to move in the predetermined direction (Y2 direction).

Accordingly, the negative pressure from the negative pressure introduction port 24f mainly moves the movable valve 24b in the differential pressure valve 24. Therefore, in the configuration indicated in the embodiment, the compact differential pressure valve 24 can have a configuration with a less pressure loss.

Note that, an arrow illustrated by the reference numeral NP in FIGS. 3 and 4 indicates a direction along which the gas (air) to be sucked through the negative pressure introduction passage 25 flows. Moreover, an arrow illustrated by a reference numeral V and illustrated in dotted line in FIGS. 3 and 4 indicates a flow of the evaporated fuel gas flowing from the first breather passage 22a via the lower chamber 24e into the second breather passage 22b.

Among actions by the fuel storage device in the embodiment configured in this manner, in an automobile or the like to which the fuel storage device is applied, an action in supply of fuel to the fuel tank will be described below.

It is assumed that an automobile or the like to which the fuel storage device 1 in the embodiment is applied is in, for example, a fuel supply oil facility, and is in a state of an engine being stopped. At this time, firstly, a lid member (not illustrated) is removed from the supply oil port 12a. Next, the supply oil nozzle 101 of the supply oil gun 100 in a supply oil device (not illustrated) is inserted from the supply oil port 12a toward the inside of the supply oil pipe 12, and is disposed at a prescribed position. In such a state, a normal supply oil operation is performed.

When a normal fuel supply oil operation is started in this manner, the fuel F flowing out from the supply oil nozzle 101 flows through the supply oil pipe 12 into the inside of the fuel tank 11, and is gradually stored in the fuel tank 11.

In the inside of the fuel tank 11, as the fuel F is poured, the oil level gradually rises. With the rise of the oil level, the evaporated fuel gas V is generated in the fuel tank 11. The generation of the evaporated fuel gas V increases the internal pressure of the fuel tank 11.

Subsequently, the evaporated fuel gas V in the fuel tank 11 flows through the vent valve 15 and the vapor passage 14 into the canister 13, and is recovered into the canister 13. In the canister 13, a predetermined action is performed such as an action in which the evaporated fuel gas V flowing into the canister 13 is adsorbed by activated charcoal, which is not illustrated. The action inside of the canister 13 is not directly related to the disclosure, and is similar to the action in generally known canisters, so that a detailed description thereof will be omitted.

In this case, the evaporated fuel gas V flowing through the vapor passage 14 is also shunted to the vapor branch passage 14a. The evaporated fuel gas V shunted to the vapor branch passage 14a generates a predetermined negative pressure in the main body 23a, when passing through the ejector 23. The negative pressure generated in the ejector 23 sucks the gas (air) in the negative pressure introduction passage 25 in the direction of the arrow reference numeral NP in FIG. 2. Herein, the other end of the negative pressure introduction passage 25 is coupled to the negative pressure introduction port 24f of the differential pressure valve 24. Therefore, the negative pressure generated in the ejector 23 sucks the gas (air) in the upper chamber 24d of the differential pressure valve 24 in the direction of the arrow reference numeral NP in FIG. 3. By receiving the suction force, the movable valve 24b of the differential pressure valve 24 moves in the direction of the arrow reference numeral Y2 in FIG. 3.

Simultaneously, the evaporated fuel gas V generated in the fuel tank 11 flows out from the first breather passage 22a of the breather passage 22 into the lower chamber 24e of the differential pressure valve 24. The evaporated fuel gas V, which has flowed into the lower chamber 24e, flows into the second breather passage 22b from the gap between the lower surface of the movable valve 24b and the end opening of the second breather passage 22b. The evaporated fuel gas V then flows into the vicinity of the supply oil port 12a of the supply oil pipe 12 through the second breather passage 22b. In addition, the evaporated fuel gas V, which has flowed into the supply oil port 12a, is returned to the inside of the fuel tank 11 through the supply oil pipe 12 with the fuel F being supplied.

At this time, the evaporated fuel gas V, which has flowed into the lower chamber 24e of the differential pressure valve 24 from the first breather passage 22a, raises the internal pressure in the lower chamber 24e. Accordingly, the positive internal pressure generated in the lower chamber 24e serves as a pressing force in the arrow Y2 direction in FIG. 3 to the movable valve 24b against an urging force of the urging spring 24c in the arrow Y1 direction in FIG. 3, and lifts and moves the movable valve 24b in the arrow Y2 direction.

In this manner, the movable valve 24b moves in the predetermined direction (the arrow Y2 direction) by the suction force that is generated by the negative pressure generated in the ejector 23 in the arrow NP direction in FIGS. 3 and 4 and the pressing force in the arrow Y2 direction in FIG. 3 by the positive internal pressure generated by the evaporated fuel gas flowing into the lower chamber 24e of the differential pressure valve 24.

Accordingly, the gap between the lower surface of the movable valve 24b and the end opening of the second breather passage 22b is widened. Accordingly, the flow rate of the evaporated fuel gas V flowing out from the gap into the first breather passage 22a increases. In this case, the change in the movement amount of the movable valve 24b of the differential pressure valve 24 changes the flow rate of the evaporated fuel gas V passing through the differential pressure valve 24.

In supply of fuel, the time of an increase in the internal pressure of the fuel tank 11 in a case where the high-speed supply oil operation is performed in order to fill the fuel tank 11 (hereinafter, referred to as in supply oil at high speed) becomes faster than the time of an increase in the internal pressure of the fuel tank 11 in a case where the supply oil operation is performed by setting the supply oil speed to the fuel tank 11 at a flow rate (hereinafter, referred to as in supply oil at low speed).

Accordingly, the flow rate and the flow speed of the evaporated fuel gas V flowing via the vent valve 15 through the vapor passage 14 and the vapor branch passage 14a become larger in supply oil at high speed than in supply oil at low speed. Accordingly, the negative pressure that is generated in the ejector 23 becomes higher in supply oil at high speed than that in supply oil at low speed. Therefore, the movement amount of the movable valve 24b of the differential pressure valve 24 becomes smaller in supply oil at low speed than in supply oil at high speed. Accordingly, the flow rate of the evaporated fuel gas V passing through the differential pressure valve 24 is adjusted so as to be smaller in supply oil at low speed than in supply oil at high speed.

In other words, in accordance with the flow rate in which the evaporated fuel gas V generated in the fuel tank 11 flows through the vapor branch passage 14a, the negative pressure that is generated in the ejector 23 changes. The change in the negative pressure that is generated in the ejector 23 changes the suction force to suck the gas (air) in the negative pressure introduction passage 25. The change in the suction force of the gas (air) in the negative pressure introduction passage 25 changes the movement amount of the movable valve 24b in the arrow Y2 direction. Accordingly, the change in the movement amount in the arrow Y2 direction in the movable valve 24b changes the flow rate of the evaporated fuel gas V passing through the differential pressure valve 24.

Note that, when the engine is started, the fuel F that is stored in the fuel tank 11 is supplied to the engine through a fuel pump, a fuel injection device or the like (not illustrated). At this time, a negative pressure is generated in an intake passage (not illustrated) of the engine. Subsequently, evaporated fuel gas recovered in the canister 13 is sucked and purged through the purge passage 16 and the opened purge control valve 17. Accordingly, the evaporated fuel gas V in the canister 13 is mixed with the external air, which has flowed into the canister 13, so as to be purged to the intake passage (not illustrated).

As has been described, with the one embodiment, a part of the vapor passage 14 that fluidly connects the fuel tank 11 and the canister 13 is branched to provide the vapor branch passage 14a, and the ejector 23 that generates a negative pressure is provided on the vapor branch passage 14a. Further, the negative pressure introduction passage 25 fluidly connects the ejector 23 and the differential pressure valve 24 that is provided on the breather passage 22 that fluidly connects the fuel tank 11 and the vicinity of the supply oil port 12a of the supply oil pipe 12. In one embodiment, the breather passage 22 may serve as a "circulation passage".

With such a configuration, in supply of fuel, using the flow of the evaporated fuel gas V flowing from the fuel tank 11 into the canister 13, a negative pressure is generated by the ejector 23, and open valve adjustment control of the differential pressure valve 24 is performed by using the negative pressure. At this time, the negative pressure generated by the ejector 23 is used as a main power source of the movable valve 24b of the differential pressure valve 24.

In other words, the movable valve 24b cannot be opened by variation alone in the positive pressure that is generated by the evaporated fuel gas V, which has flowed into the lower chamber 24e of the differential pressure valve 24 from the first breather passage 22a, when the internal pressure of the fuel tank 11 increases, but the open valve operation of the movable valve 24b is performed in a case where a constant negative pressure from the negative pressure introduction passage 25 is generated.

Accordingly, for that reason, in the differential pressure valve 24, an urging force when regulating the gap between the lower surface of the movable valve 24b and the end opening of the second breather passage 22b by urging the movable valve 24b in the predetermined direction (the arrow Y1 direction), in other word, an urging force of the urging spring 24c can be set high. This reduces the instability of the open valve control due to influences by components of the differential pressure valve 24 and manufacturing tolerances of the fuel tank 11, and more stable open valve control can be performed.

Moreover, the variation of the flow rate of the evaporated fuel gas V flowing in the vapor passage 14 that couples the fuel tank 11 to the canister 13 is dominated by the "supply oil speed", so that the variation in the negative pressure that is generated in the ejector 23 can be easily controlled. This results in obtaining an effect capable of performing the open valve control of the differential pressure valve 24 with high accuracy.

The embodiment adds the following simple configuration. That is, the differential pressure valve 24 is provided on the breather passage 22, which is also normally disposed in a fuel storage device of a related art, the ejector 23 is provided on the vapor passage 14 that fluidly connects the fuel tank 11 and the canister 13, and a passage that fluidly connects the differential pressure valve 24 and the ejector 23 is further provided. Accordingly, emission of the evaporated fuel gas to the outside in supply of fuel can be prevented more effectively.

This can be very easily implemented by the simple structure change of simply changing the configuration of the upper portion side of the fuel tank 11, for example.

The disclosure is not limited to the embodiments, but various modifications and applications can be naturally made without departing from the spirit of the disclosure. Further, the embodiment includes disclosures at various stages, and the various disclosures can be extracted from the embodiment by appropriately combining plural disclosed elements. For example, even if some elements are removed from all the elements indicated in the embodiment, when the problem to be solved by the disclosure can be solved and the effect by the disclosure can be obtained, this configuration in which the elements are deleted can be extracted as the disclosure. In addition, elements over the different embodiments can be combined as appropriate. The disclosure is limited by the appended claims, but is not limited by the specific embodiment.

The invention claimed is:

1. A fuel storage device comprising:
   a fuel tank configured to store fuel;
   a circulation passage that fluidly connects the fuel tank and a vicinity of a fuel supply port;
   a canister configured to recover gas to be generated in the fuel tank;
   a vapor passage that fluidly connects the fuel tank and the canister;
   a vent valve coupled to the fuel tank and configured to release the gas from the fuel to the canister; and
   an adjuster configured to adjust a circulation flow rate of the gas flowing through the circulation passage in supply of the fuel, using a negative pressure, wherein an inlet from the fuel tank to the vent valve is separate from an inlet from the fuel tank to the adjuster.

2. The fuel storage device according to claim 1, wherein the adjuster is disposed on the circulation passage.

3. The fuel storage device according to claim 2, further comprising:
   a negative pressure generator disposed on a vapor branch passage that is branched off from the vapor passage and is then again joined to the vapor passage, the negative pressure generator being configured to generate a negative pressure; and
   a negative pressure introduction passage that fluidly connects the negative pressure generator and the adjuster.

4. The fuel storage device according to claim 3, wherein the adjuster comprises
   a housing member comprising
      an inflow opening into which the gas flows,
      an outflow opening through which the gas, which has flowed into the inflow opening, flows out to a side of the fuel supply port, and
      a negative pressure inlet coupled to the negative pressure introduction passage;
   a movable valve member that partitions an inside of the housing member into two chambers, the movable valve member being movable inside the housing member; and
   an urging member that urges the movable valve member in such a first direction that the movable valve member blocks the outflow opening.

5. The fuel storage device according to claim 4, wherein the movable valve member is configured to move in a second direction so as to open the outflow opening using the negative pressure from the negative pressure inlet.

6. The fuel storage device according to claim 1, further comprising:
   a negative pressure generator disposed on a vapor branch passage that is branched off from the vapor passage and is then again joined to the vapor passage, the negative pressure generator being configured to generate a negative pressure; and
   a negative pressure introduction passage that fluidly connects the negative pressure generator and the adjuster.

7. The fuel storage device according to claim 6, wherein the adjuster comprises
   a housing member comprising
      an inflow opening into which the gas flows,
      an outflow opening through which the gas, which has flowed into the inflow opening, flows out to a side of the fuel supply port, and
      a negative pressure inlet coupled to the negative pressure introduction passage;
   a movable valve member that partitions an inside of the housing member into two chambers, the movable valve member being movable inside the housing member; and
   an urging member that urges the movable valve member in such a first direction that the movable valve member blocks the outflow opening.

8. The fuel storage device according to claim 7, wherein the movable valve member is configured to move in a second direction so as to open the outflow opening using the negative pressure from the negative pressure inlet.

9. The fuel storage device according to claim 1, wherein the gas that flows from the fuel tank to the canister via the adjuster is combined with the gas that flows from the fuel tank to the canister via the vent valve.

10. The fuel storage device according to claim 1, wherein the circulation passage includes:
    a first breather passage at a side of the fuel tank from the adjuster; and
    a second breather passage at a side of the fuel supply port from the adjuster.

11. The fuel storage device according to claim 10, wherein the first breather passage communicates with the fuel tank and the adjuster, and
    wherein the second breather passage communicates with the adjuster and a predetermined portion of the supply oil port.

12. The fuel storage device according to claim 1, further comprising negative pressure generator that generates a negative pressure using a part of the gas in a vapor passage from the vent valve that fluidly connects the fuel tank and the canister.

13. A fuel storage device comprising:
a fuel tank configured to store fuel;
a circulation passage that fluidly connects the fuel tank and a vicinity of a fuel supply port;
a canister configured to recover gas to be generated in the fuel tank;
a vapor passage that fluidly connects the fuel tank and the canister;
an adjuster configured to adjust a circulation flow rate of the gas flowing through the circulation passage in supply of the fuel, using a negative pressure; and
a negative pressure generator disposed on a vapor branch passage that is branched off from the vapor passage and is then again joined to the vapor passage, the negative pressure generator being configured to generate a negative pressure.

14. A fuel storage device comprising:
a fuel tank configured to store fuel;
a circulation passage that fluidly connects the fuel tank and a vicinity of a fuel supply port;
a canister configured to recover gas to be generated in the fuel tank;
a vapor passage that fluidly connects the fuel tank and the canister;
an adjuster configured to adjust a circulation flow rate of the gas flowing through the circulation passage in supply of the fuel, using a negative pressure;
a negative pressure generator disposed on a vapor branch passage that is branched off from the vapor passage and is then again joined to the vapor passage, the negative pressure generator being configured to generate a negative pressure; and
a negative pressure introduction passage that fluidly connects the negative pressure generator and the adjuster.

* * * * *